United States Patent [19]

Kulka

[11] 3,998,325
[45] Dec. 21, 1976

[54] REEL BAND AND METHOD OF USING SAME

[76] Inventor: Thomas S. Kulka, 2108 Payne Ave., Cleveland, Ohio 44114

[22] Filed: Jan. 2, 1976

[21] Appl. No.: 646,176

[52] U.S. Cl. .................................................. 206/400
[51] Int. Cl.$^2$ ................. B65D 85/67; B65D 85/671
[58] Field of Search ............ 206/398, 400; 242/192

[56] References Cited

UNITED STATES PATENTS

| 2,141,109 | 12/1938 | Kemptgen | 206/400 |
| 2,425,100 | 8/1947 | Kulka | 206/400 |
| 2,633,983 | 4/1953 | Miller | 206/400 |

Primary Examiner—George T. Hall
Attorney, Agent, or Firm—Beall & Jeffery

[57] ABSTRACT

A reel band for securing the free end of a roll of motion picture film, magnetic tape or the like, comprising a strip of flexible polyvinyl chloride having an electrostatic charge. The charged band is of approximately the same width as the film or tape and is wrapped around the outer convolution of film or tape and pressed into secure contact. The electrostatic charge on the vinyl band causes the band to cling to the film or tape and to itself, thereby rigidly holding the outer convolutions of film or tape in position.

8 Claims, 2 Drawing Figures

REEL BAND AND METHOD OF USING SAME

BACKGROUND OF THE INVENTION

Many types of reel banding devices have been proposed in the prior art (see for example my film protector, U.S. Pat. No. 2,425,100), some of which have operated quite satisfactorily but which have been either costly to produce or relatively difficult to secure.

SUMMARY OF THE INVENTION

It is accordingly an object of the present invention to provide a bond for securing the outer convolutions of film or tape on a roll.

It is a further object of the present invention to provide such a reel banding device which is self-securing and which requires little manual dexterity to attach and release.

It is yet another object of the present invention to provide a relatively inexpensive, yet visually attractive reel banding device which may be provided with information about the information content of the roll of film or tape.

In furtherance of these and other objects which will become apparent to those skilled in the art, a reel banding device is provided which comprises a strip electrostatically charged, flexible vinyl which may be wrapped around the outer convolutions of film or tape on a roll and which will cling to the film or tape and/or to itself. In addition, means is provided at the outer end of the reel band for easily grasping and releasing the band. The invention also comprises a method of securing the outer convolutions of film or tape on a roll with such a reel banding device.

DESCRIPTION OF THE PREFERRED EMBODIMENT

Figure 1:
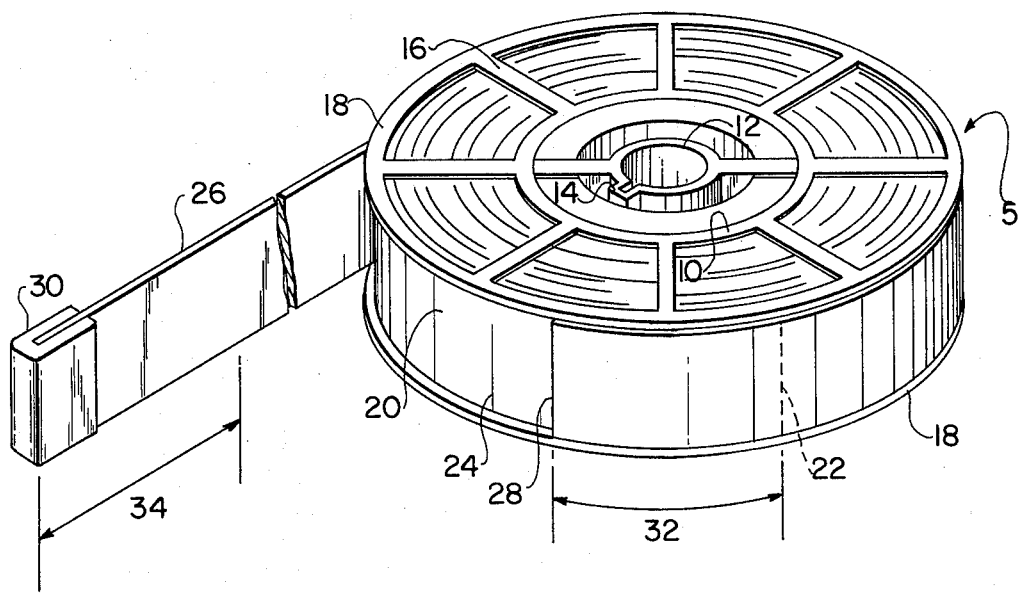
FIG. 1 is a perspective view of a roll of motion picture film wrapped on a reel and partially secured by the reel band of the present invention.
Figure 2:
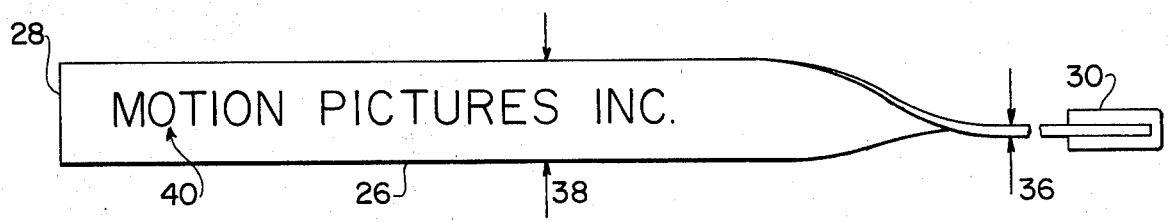
FIG. 2 is a view of a twisted reel band showing both the outer face and an edge of the band.

The following description of the preferred embodiment is made with respect to FIGS. 1 and 2, wherein like parts are indicated by like reference numerals.

A conventional film or tape reel is shown generally at 5 having motion picture film wound thereon. The reel has a hub portion 10 around which the film is wrapped and a sleeve 12 for receiving a rotatable spindle of a motion picture projector (not shown). Sleeve 12 has a slot 14 for receiving a key on the spindle (also not shown). Spokes 16 extend radially outwardly from the hub 10 to support the flanges 18, the flanges providing side support for the roll of film. It will be understood that the spokes 16 and flanges 18 are not necessary and could be deleted, leaving a roll of tape on a flangeless hub. The film 20 has a free end 22 (shown in dotted lines) and sprocket holes 24 (not shown). The film is of any conventional motion picture type, or alternatively may be a film carrying a magnetic recording medium. The reel band comprises an electrostatically charged polyvinyl chloride (hereinafter vinyl) band, which is preferably of very soft hand and may be transparent, opaque or of any desired color. The flexible vinyl band has an end portion 28 which overlaps the end portion of the film by a distance 32. The band also has a free end with a tab 30 attached, tab 30 comprising a piece of adhesive tape or the like. The reel band is of sufficient length that the tab end portion will overlap the secured end 28 by a distance 34 when the band is wrapped entirely around the reel. Reel band 26 has a width 38 which is approximately the same as the width of the film or tape, and is preferably somewhat narrower than the film or tape width. The vinyl band thickness is preferably 0.010 inches, but it will be understood that any suitable thickness may be used. Reference numeral 40 represents lettering which may be printed or embossed on the vinyl band, and which may include information about the film or tape content or other data.

To use the band, the band end 28 is placed over film end 22 with an overlap 32 and then wrapped around the outer convolution of film, preferably in the direction of the film wrap. The vinyl band 26 naturally clings to the film due to the electrostatic charge on the band. To achieve greater adherence, the band may be pressed firmly against the film by any suitable means, such as the fingers. The band will adhere to the film and hold the outer film convolutions in place even if the band length is less than the circumference of the film convolutions. However, optimum results are achieved if there is some overlap of the band with itself, since the band will under most circumstances cling to itself with greater force than to the film. When the film is thus secured, it may be handled and transported without danger of the outer convolutions of film or tape becoming unwrapped or damaged.

To release the reel band, the tab portion 30 is lifted away from the reel and the band unwound from the roll of film. The reel band may be removed entirely from the film end 22 for threading of the film in a projector, and it will be observed that no damage of any kind to the film end results from the banding according to the present invention.

It will be apparent to those skilled in the art that minor modifications of the present invention may be made within the spirit and scope of this disclosure. It will also be understood that the term "film", as used in the claims which follow, is intended to mean photographic film for motion pictures or still pictures as well as magnetic recording tape, microfilm or related materials. It should also be noted that laminates containing polyvinyl chloride or coatings of polyvinyl chloride on other substrates can be employed so long as the above described characteristics of polyvinyl chloride when used alone still reside.

I claim:

1. A device for preventing the unwinding of film wound on a reel, said film having an outer convolution terminating in a free end, comprising
   a band of electrostatically charged synthetic material capable of being wrapped at least partially around the outer convolution of said film and covering said free end, whereby said band will cling electrostatically to said outer convolution of film and prevent motion of said free end relative to said outer convolution.

2. The device of claim 1, wherein said synthetic material comprises a sheet flexible polyvinyl chloride.

3. The device of claim 1, wherein the length of said band is greater than the circumference of said outer convolution of film.

4. The device of claim 1, wherein the width of said band is substantially the same as the width of said film.

5. The device of claim 1, wherein the width of said band is less than the width of said film.

6. The device of claim 1, wherein one end of said band has a non-electrostatically charged tab portion affixed thereto, whereby when said band is wrapped around said outer convolution of film with said tab portion protruding, the tab portion may be easily grasped for removal of said band.

7. The device of claim 1, wherein said band has printed information thereon.

8. A method of preventing the unwinding of film wound on a reel, said film having an outer convolution terminating in a free end, comprising the steps of:
wrapping a band of electrostatically charged synthetic material at least partially around the outer convolution of said film, and covering said free end whereby said band will cling electrostatically to said outer convolution of film and thereby prevent motion of said free end relative to said outer convolution.

* * * * *